(12) United States Patent
Nadella et al.

(10) Patent No.: US 8,877,867 B2
(45) Date of Patent: Nov. 4, 2014

(54) PROCESS FOR FORMING THERMOPLASTIC VULCANIZATES AND EXTRUDED ARTICLES THEREFROM

(75) Inventors: Hari P. Nadella, Copley, OH (US); Jianya Cheng, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 816 days.

(21) Appl. No.: 12/579,998

(22) Filed: Oct. 15, 2009

(65) Prior Publication Data

US 2010/0113694 A1 May 6, 2010

Related U.S. Application Data

(60) Provisional application No. 61/111,845, filed on Nov. 6, 2008.

(51) Int. Cl.
| | | |
|---|---|---|
| *C08F 8/00* | (2006.01) | |
| *C08L 23/00* | (2006.01) | |
| *C08L 23/04* | (2006.01) | |
| *C08L 23/16* | (2006.01) | |
| *C08K 5/14* | (2006.01) | |

(52) U.S. Cl.
CPC .. *C08L 23/16* (2013.01); *C08K 5/14* (2013.01)
USPC ............ 525/194; 525/240; 525/191; 525/232

(58) Field of Classification Search
CPC ....................................................... C08L 23/16
USPC .................................................. 525/240, 191
See application file for complete search history.

(56) References Cited

U.S. PATENT DOCUMENTS

| | | | |
|---|---|---|---|
| 2,972,600 A | 2/1961 | Braidwood | |
| 3,287,440 A | 11/1966 | Giller | |
| 4,087,485 A | 5/1978 | Huff | |
| 4,311,628 A | 1/1982 | Abdou-Sabet et al. | |
| 4,375,531 A * | 3/1983 | Ross ............................... 525/93 | |
| 4,540,753 A | 9/1985 | Cozewith et al. | |
| 4,594,390 A | 6/1986 | Abdou-Sabet et al. | |
| 4,810,752 A | 3/1989 | Bayan | |
| 4,978,714 A | 12/1990 | Bayan et al. | |
| 5,013,793 A | 5/1991 | Wang et al. | |
| 5,021,500 A | 6/1991 | Puydak et al. | |
| 5,100,947 A | 3/1992 | Puydak et al. | |
| 5,157,081 A | 10/1992 | Puydak et al. | |
| 5,290,866 A | 3/1994 | Dobreski et al. | |
| 5,384,366 A * | 1/1995 | Paganelli ...................... 525/133 | |
| 5,397,832 A | 3/1995 | Ellul | |
| 5,578,682 A * | 11/1996 | White ............................. 525/282 | |
| 5,656,693 A | 8/1997 | Ellul et al. | |
| 5,936,028 A | 8/1999 | Medsker et al. | |
| 5,952,425 A | 9/1999 | Medsker et al. | |
| 6,042,260 A | 3/2000 | Heidemeyer et al. | |
| 6,147,160 A | 11/2000 | Wang et al. | |
| 6,437,030 B1 * | 8/2002 | Coran et al. .................. 524/101 | |
| 6,451,915 B1 | 9/2002 | Ellul et al. | |
| 6,506,842 B1 * | 1/2003 | Heck et al. ..................... 525/194 | |
| 6,747,099 B1 | 6/2004 | Novits et al. | |
| 6,867,260 B2 | 3/2005 | Datta et al. | |
| 6,951,904 B1 * | 10/2005 | Peeters et al. ................. 525/265 | |
| 7,226,964 B2 | 6/2007 | Debaud et al. | |
| 7,232,871 B2 | 6/2007 | Datta et al. | |
| 7,235,609 B2 * | 6/2007 | Dharia et al. ................. 525/240 | |
| 2003/0013813 A1 * | 1/2003 | Ellul et al. .................... 525/191 | |
| 2005/0277742 A1 * | 12/2005 | Roegiers .................... 525/333.7 | |
| 2006/0293454 A1 | 12/2006 | Nadella et al. | |
| 2006/0293457 A1 * | 12/2006 | Nadella et al. ................ 525/192 | |
| 2007/0021564 A1 | 1/2007 | Ellul et al. | |
| 2007/0083008 A1 | 4/2007 | Ellul et al. | |
| 2007/0135571 A1 | 6/2007 | Ellul et al. | |
| 2007/0142565 A1 * | 6/2007 | Chaudhary et al. ......... 525/330.3 | |

FOREIGN PATENT DOCUMENTS

| | | |
|---|---|---|
| WO | WO 02/28946 | 4/2002 |
| WO | WO 02/077089 | 10/2002 |
| WO | WO 2004/009327 | 1/2004 |
| WO | WO 2005/092966 | 10/2005 |

OTHER PUBLICATIONS

Ellul, M.D. et al., "*Chemical Surface Treatments of Natural Rubber and EPDM Thermoplastic Elastomers: Effects on Friction and Adhesion*", Rubber Chemistry and Technology, 1994, vol. 67, pp. 582-601.
Ellul, M.D. et al. "*Crosslink Densities and Phase Morphologies in Dynamically Vulcanized TPEs*", Rubber Chemistry and Technology, 1995, vol. 68, pp. 573-584.
Ver Strate, G. et al., "*Near Monodisperse Ethylene-Propylene Copolymers by Direct Ziegler-Natta Polymerization. Preparation, Characterization, Properties*", Macromolecules, 1988, vol. 21, pp. 3360-3371.

\* cited by examiner

*Primary Examiner* — Irina Krylova

(57) ABSTRACT

A process for preparing modified thermoplastic vulcanizate compositions, the process comprising the steps of introducing molten thermoplastic vulcanizate and a free-radical source, where the thermoplastic vulcanizate includes cured rubber dispersed within a thermoplastic matrix.

14 Claims, No Drawings

PROCESS FOR FORMING THERMOPLASTIC VULCANIZATES AND EXTRUDED ARTICLES THEREFROM

CROSS-REFERENCE TO RELATED APPLICATIONS

This application claims priority from U.S. Provisional Application Ser. No. 61/111,845, filed Nov. 6, 2008, the contents of which are incorporated herein by reference in its entirety.

FIELD OF THE INVENTION

Embodiments of the present invention are directed toward methods for forming or modifying thermoplastic vulcanizates to provide thermoplastic vulcanizates capable of forming extruded articles with desirable surface appearance.

BACKGROUND OF THE INVENTION

Thermoplastic vulcanizates include blends of dynamically cured rubber and thermoplastic polymers. The rubber may be dispersed within the thermoplastic resin phase as finely-divided rubber particles. These compositions have advantageously demonstrated many of the properties of thermoset elastomers, yet they are processable as thermoplastics.

Because thermoplastic vulcanizates are advantageously processable as thermoplastics, elastomeric articles are often extruded from thermoplastic vulcanizates using thermoplastic extruding techniques. In certain situations, it is desirable for the extruded article to have a surface appearance characterized by surface smoothness. The ability to achieve high quality smoothness has long been a challenge in the thermoplastic vulcanizate art.

For example, U.S. Pat. No. 6,451,915 teaches thermoplastic vulcanizates including linear polyolefin resins or diene-modified polyolefin resins that have a melt flow rate that is greater than 1,000 dg/min and a viscosity average branching index that is from about 0.4 to about 0.95. These thermoplastic vulcanizates advantageously demonstrate an improved processability and surface appearance without deleteriously sacrificing mechanical properties.

U.S. Patent Application Publication No. 2006/0293454 describes a process for preparing low durometer thermoplastic vulcanizate compositions that includes introducing process oil into the melt blending before, during, and/or after the addition of a cure agent to the extruder. When a preferred combination of kneading blocks was employed, improved surface appearance of extruded profiles could be achieved.

U.S. Patent Application Publication No. 2007/0135571 teaches a process for the preparation of thermoplastic vulcanizates where a process oil is added to the extruder in at least three oil injection positions. This technique yields thermoplastic vulcanizates capable of being extrusion molded with a smooth surface and low surface spot count in addition to excellent elastomeric properties.

SUMMARY OF THE INVENTION

One or more embodiments of the present invention provides a process for preparing modified thermoplastic vulcanizate compositions, the process comprising the steps of introducing molten thermoplastic vulcanizate and a free-radical source, where the thermoplastic vulcanizate includes cured rubber dispersed within a thermoplastic matrix.

One or more embodiments of the present invention further provides a continuous process for preparing thermoplastic vulcanizates, the process comprising the steps of (i) dynamically vulcanizing a rubber in a first stage of the process to form a thermoplastic vulcanizate that is in a molten state, (ii) maintaining the thermoplastic vulcanizate in a molten state until a second stage, and (iii) introducing the molten thermoplastic vulcanizate and a free-radical source in the second stage of the process to form a modified thermoplastic vulcanizate.

One or more embodiments of the present invention further provides a process for producing thermoplastic vulcanizates, the process comprising the steps of (i) introducing rubber and thermoplastic resin into a reactive extruder, (ii) introducing a curative into the reactive extruder at a location downstream of the location of said introducing rubber and thermoplastic resin, (iii) mixing the rubber, the thermoplastic resin, and the curative, (iv) allowing said curative to cure the rubber and thereby cause phase inversion of the rubber within the thermoplastic resin, and (v) introducing a free-radical source into the reactive extruder at a location downstream of the phase inversion of the rubber, thereby modifying the thermoplastic resin.

DETAILED DESCRIPTION OF ILLUSTRATIVE EMBODIMENTS

I. Introduction

Embodiments of the present invention are directed toward methods for forming thermoplastic vulcanizate compositions that yield extruded articles characterized by technologically useful surface appearance, such as surface smoothness. Advantageously, these desirable surface properties can be achieved without deleteriously compromising the mechanical properties of the thermoplastic vulcanizate. In one or more embodiments, the thermoplastic vulcanizate compositions are treated with a free-radical source while the thermoplastic vulcanizate is in its molten state. In one or more embodiments, by treating the thermoplastic vulcanizates with a free-radical source, the molecular weight and molecular weight distribution of the plastic phase is believed to be altered, and therefore, the treatment step may be referred to as polydispersity modification. In particular embodiments, the step of polydispersity modification occurs within a second stage of a manufacturing process that prepares the thermoplastic vulcanizate in a first stage and maintains the thermoplastic vulcanizate in its molten state between the first and second stages of the process.

II. Thermoplastic Vulcanizate

Practice of the present invention is not necessarily limited by the selection of the thermoplastic vulcanizate composition that is treated according to the present invention. In one or more embodiments, the thermoplastic vulcanizate composition includes a continuous thermoplastic phase with a cured rubber phase dispersed therein. In particular embodiments, the rubber phase is a discontinuous phase dispersed within the thermoplastic phase. These compositions can be prepared by dynamic vulcanization of a rubber in the presence of a thermoplastic polymer.

a. Rubber Component

The rubbers that may be employed to form the rubber phase include those polymers that are capable of being cured or crosslinked. Reference to a rubber may include mixtures of more than one rubber. Non-limiting examples of rubbers include olefinic elastomeric copolymers, butyl rubber, and mixtures thereof. In one or more embodiments, olefinic elastomeric copolymers include ethylene-propylene-non-conjugated diene rubbers or propylene-based rubbery copolymers containing units derived from non-conjugated diene monomers.

b. Ethylene-Propylene Rubber

The term ethyl-propylene rubber refers to rubbery copolymers polymerized from ethylene, at least one α-olefin monomer, and at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. Copolymers prepared from ethylene, α-olefin, and diene monomers may be referred to as a terpolymer or even a tetrapolymer in the event that multiple α-olefins or dienes are used.

In one or more embodiments, the ethylene-propylene rubber includes from about 12% to about 85% by weight, or from about 20% to about 80% by weight, or from about 40% to about 70% by weight, or from about 60% to about 66% by weight ethylene units deriving from ethylene monomer, and from about 0.1% to about 15% by weight, or from about 0.5% to about 12% by weight, or from about 1% to about 10% by weight, or from about 2% to about 8% by weight diene units deriving from diene monomer, with the balance including α-olefin units deriving from α-olefin monomer (e.g., $C_3$-$C_{10}$ olefins, such as propylene). Expressed in mole percent, the terpolymer of one embodiment includes from about 0.1 mole percent to about 5 mole percent, or from about 0.5 mole percent to about 4 mole percent, or from about 1 mole percent to about 2.5 mole percent diene units deriving from diene monomer. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1% to about 15% by weight, in other embodiments from about 5% to about 12% by weight, and in other embodiments from about 7% to about 11% by weight units deriving from 5-ethylidene-2-norbornene. In one or more embodiments, where the diene includes 5-ethylidene-2-norbornene, the ethylene-propylene rubber may include at least 1% by weight; in other embodiments, at least 3% by weight; in other embodiments, at least 4% by weight; in other embodiments, at least 5% by weight; in other embodiments, from about 1% to about 15% by weight; in other embodiments, from about 5% to about 12% by weight; and in other embodiments, from about 7% to about 11% by weight units deriving from 5-ethylidene-2-norbornene. In one or more embodiments, where the diene includes 5-vinyl-2-norbornene, the ethylene-propylene rubber may include at least 1% by weight; in other embodiments, at least 3% by weight; in other embodiments, at least 4% by weight; in other embodiments, at least 5% by weight; in other embodiments, from about 1% to about 15% by weight; in other embodiments, from about 5% to about 12% by weight; and in other embodiments, from about 7% to about 11% by weight units deriving from 5-vinyl-2-norbornene.

In one or more embodiments, ethylene-propylene rubber may have a weight average molecular weight ($M_w$) that is greater than 100,000 g/mole; in other embodiments, greater than 200,000 g/mole; in other embodiments, greater than 400,000 g/mole; and in other embodiments, greater than 600,000 g/mole; in these or other embodiments, the Mw of the preferred ethylene-propylene rubber is less than 1,200,000 g/mole; in other embodiments less than 1,000,000 g/mole; in other embodiments, less than 900,000 g/mole; and in other embodiments, less than 800,000 g/mole. In one or more embodiments, useful ethylene-propylene rubbers have a number average molecular weight ($M_n$) that is greater than 20,000 g/mole; in other embodiments, greater than 60,000 g/mole; in other embodiments, greater than 100,000 g/mole; and in other embodiments, greater than 150,000 g/mole; in these or other embodiments, the $M_n$ of the ethylene-propylene rubbers of one or more embodiments is less than 500,000 g/mole; in other embodiments, less than 400,000 g/mole; in other embodiments, less than 300,000 g/mole; and in other embodiments, less than 250,000 g/mole. Techniques for determining the molecular weight ($M_n$, $M_w$ and $M_z$) and molecular weight distribution (MWD) may be found in U.S. Pat. No. 4,540,753 (Cozewith, Ju and Ver Strate) (which is incorporated by reference herein for purposes of U.S. practices) and references cited therein, and in Ver Strate et al., "Near Monodisperse Ethylene-Propylene Copolymers by Direct Ziegler-Natta Polymerization, Preparation, Characterization, Properties," *Macromolecules*, Vol. 21, pp. 3360-3371 (1988), which is herein incorporated by reference for purposes of U.S. practices, and references cited therein.

In one or more embodiments, ethylene-propylene rubber may also be characterized by having a Mooney viscosity ($ML_{(1+4)}$@125° C.) per ASTM D-1646, of from about 10 to about 500 or from about 50 to about 450. As used herein, Mooney viscosity is reported using the format: Rotor ([pre-heat time, min.]+[shearing time, min.] @ measurement temperature, ° C.), such that ML (1+4@125° C.) indicates a Mooney viscosity determined using the ML or large rotor according to ASTM D1646-99, for a pre-heat time of 1 minute and a shear time of 4 minutes, at a temperature of 125° C.

Unless otherwise specified, Mooney viscosity is reported herein as ML(1+4@125° C.) in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8@125° C. or 150° C.) More preferably, the Mooney measurement for purposes herein is carried out using a non-standard small rotor. The non-standard rotor design is employed with a change in the Mooney scale that allows the same instrumentation on the Mooney instrument to be used with polymers having a Mooney viscosity over about 100 ML(1+4@125° C.). For purposes herein, this modified Mooney determination is referred to as MST—Mooney Small Thin.

ASTM D1646-99 prescribes the dimensions of the rotor to be used within the cavity of the Mooney instrument. This method allows for both a large and a small rotor, differing only in diameter. These different rotors are referred to in ASTM D1646-99 as ML (Mooney Large) and MS (Mooney Small). However, EPDM can be produced at such high molecular weight that the torque limit of the Mooney instrument can be exceeded using these standard prescribed rotors. In these instances, the test is run using the MST rotor that is both smaller in diameter and thinner. Typically, when the MST rotor is employed, the test is also run at different time constants and temperatures. The pre-heat time is changed from the standard 1 minute to 5 minutes, and the test is run at 200° C. instead of the standard 125° C. The value obtained under these modified conditions is referred to herein as MST (5+4@200° C.). Note: the run time of 4 minutes, at the end of which the Mooney reading is taken, remains the same as the standard conditions. One MST point is approximately equivalent to 5 mL points when MST is measured at (5+4@200° C.) and ML is measured at (1+4@125° C.). Accordingly, for the purposes of an approximate conversion between the two scales of measurement, the MST (5+4@200° C.) Mooney value is multiplied by 5 to obtain an approximate ML(1+4 @125° C.) value equivalent. The MST rotor used herein was prepared and utilized according to the following specifications.

The rotor should have a diameter of 30.48+/−0.03 mm and a thickness of 2.8+/−0.03 mm (determined from the tops of serrations) and a shaft of 11 mm or less in diameter.

The rotor should have a serrated face and edge, with square grooves of about 0.8 mm width and depth of about 0.25-0.38 mm cut on 1.6 mm centers. The serrations will consist of two sets of grooves at right angles to each other thereby forming a square crosshatch.

The rotor shall be positioned in the center of the die cavity such that the centerline of the rotor disk coincides with the centerline of the die cavity to within a tolerance of +/−0.25 mm. A spacer or a shim may be used to raise the shaft to the midpoint, consistent with practices typical in the art for Mooney determination.

The wear point (cone shaped protuberance located at the center of the top face of the rotor) shall be machined off flat with the face of the rotor.

Mooney viscosities of the multimodal polymer composition may be determined on blends of polymers herein. The Mooney viscosity of a particular component of the blend is obtained herein using the relationship shown in (1):

$$\log ML = n_A \log ML_A + n_B \log ML_B \quad (1)$$

wherein all logarithms are to the base 10; ML is the Mooney viscosity of a blend of two polymers A and B each having individual Mooney viscosities $ML_A$ and $ML_B$, respectively; $n_A$ represents the wt. % fraction of polymer A in the blend; and $n_B$ represents the wt. % fraction of the polymer B in the blend.

In the instant disclosure, Equation (1) has been used to determine the Mooney viscosity of blends comprising a high Mooney viscosity polymer (A) and a low Mooney viscosity polymer (B), which have measurable Mooney viscosities under (1+4@125° C.) conditions. Knowing ML, $ML_A$ and $n_A$, the value of $ML_B$ can be calculated.

However, for high Mooney viscosity polymers (i.e., Mooney viscosity greater than 100 ML(1+4@125° C.), $ML_A$ is measured using the MST rotor as described above. The Mooney viscosity of the low molecular weight polymer in the blend is then determined using Equation 1 above, wherein $ML_A$ is determined using the following correlation (2):

$$ML_A(1+4@125° C.) = 5.13 * MST_A(5+4@200° C.)$$

In one or more embodiments, ethylene-propylene rubber may be characterized by having an intrinsic viscosity, as measured in decalin at 135° C. per ASTM D-1601, of from about 1 dl/g to about 8 dl/g, or from about 3 dl/g to about 7 dl/g, or from about 4 dl/g to about 6.5 dl/g.

In one or more embodiments, the ethylene-propylene rubber may be characterized by a glass transition temperature ($T_g$), as determined by Differential Scanning Calorimetry (DSC) according to ASTM E-1356, that is less than −20° C., in other embodiments less than −30° C., in other embodiments less than −50° C., and in other embodiments from about −20° C. to about −60° C.

Ethylene-propylene rubber may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts involving Group IV-VI metallocenes. Elastomeric copolymers are commercially available under the tradenames Vistalon™ (ExxonMobil Chemical Co.; Houston, Tex.), Keltan™ (DSM Copolymers), Nordel™ IP (Dow), NORDEL MG™ (Dow), Royalene™ (Lion Copolymer) and Buna™ (Lanxess).

c. Propylene-Based Rubbery Copolymer

In one or more embodiments, the propylene-based rubbery copolymer, which may also be referred to as propylene-α-olefin copolymers or propylene-based elastomers, include units (i.e., mer units) derived from propylene, one or more comonomer units derived from ethylene or α-olefins including from 4 carbon atoms to about 20 carbon atoms, and optionally one or more comonomer units derived from dienes. In one or more embodiments, the α-olefin comonomer units may derive from ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

In one or more embodiments, the propylene-based rubbery copolymers may include at least 5% by weight, in other embodiments at least 6% by weight, in other embodiments at least 8% by weight, and in other embodiments at least 10% by weight ethylene-derived units; in these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived units, and α-olefin derived units. Stated another way, the propylene-based rubbery copolymers may include at least 60% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived and ethylene-derived mer units.

In one or more embodiments, the propylene-based rubbery copolymers may include at least 0.5% by weight, in other embodiments at least 1.5% by weight, and in other embodiments at least 3% by weight diene-derived units; in these or other embodiments, the propylene-based rubbery copolymers may include up to 11% by weight, in other embodiments up to 6% by weight, and in other embodiments up to 4% by weight diene-derived units, where the percentage by weight is based upon the total weight of the propylene-derived, ethylene-derived, and diene-derived units.

The propylene-based rubbery copolymers in one or more embodiments of this invention are characterized by having a single melting temperature as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ($T_m$) of the propylene-based rubbery copolymer. In one or more embodiments, the $T_m$ of the propylene-based rubbery copolymer is less than 110° C.; in other embodiments, less than 90° C.; in other embodiments, less than 80° C.; and in other embodiments, less than 70° C.; in these or other embodiments, the propylene-based rubbery copolymer has a $T_m$ of at least 25° C.; in other embodiments, at least of 35° C.; in other embodiments, at least of 40° C.; and in other embodiments, at least of 45° C. In particular embodiments, the propylene-based rubbery copolymer exhibits no melting point.

In one or more embodiments, the propylene-based rubbery copolymer may be characterized by a heat of fusion (Hf), as determined according to DSC procedures according to ASTM E-793. This may be determined by placing 6 to 10 mg of sample into DSC equipment and heating the sample at about 10° C./min. In one or more embodiments, the propylene-based rubbery copolymer may be characterized by a heat of fusion of about 0 J/g; in other embodiments, at least 0.5 J/g; in other embodiments, at least 1.0 J/g; in other embodiments, at least 1.5 J/g; in other embodiments, at least 3.0 J/g; in other embodiments, at least 4.0 J/g; in other embodiments, at least 6.0 J/g; and in other embodiments, at least 7.0 J/g. In these or other embodiments, the propylene-based rubbery copolymer may be characterized by a heat of fusion that of less than 80 J/g; in other embodiments, less than 70 J/g; in other embodiments, less than 60 J/g; in other embodiments, less than 50 J/g; in other embodiments, less than 40 J/g; in other embodiments, up to 40 J/g; and in other embodiments, less than 30 J/g.

The propylene-based rubbery copolymer can have a triad tacticity of propylene units, as measured by $^{13}C$ NMR, of 75% or greater, 80% or greater, 82% or greater, 85% or greater, or 90% or greater. In one or more embodiments, ranges include from about 50% to about 99%; in other embodiments, from about 60% to about 99%; in other embodiments, from about 75% to about 99%; in other embodiments, from about 80% to about 99%; and in other embodiments, from about 60% to about 97%. Triad tacticity is determined by the methods described in U.S. Pat. No. 7,232,871.

In one or more embodiments, the propylene-based rubbery copolymer may have a % crystallinity of from 0.5% to 40%; in other embodiments, 1% to 30%; and in other embodiments, 5% to 25%. Crystallinity may be determined according to DSC procedures in accordance with ASTM E-794-95. This may be determined by placing 6 mg to 10 mg of sample into DSC equipment and heating the sample at about 10° C./min. For use herein, the crystallinity of the propylene-based rubbery copolymer can also be expressed in terms of percentage of crystallinity. The thermal energy for the highest order of polypropylene is estimated at 209 J/g (i.e., 100% crystallinity is equal to 209 J/g). In other embodiments, the propylene-ethylene polymer may have a crystallinity of less than 40%; in other embodiments, about 0.25% to about 25%; in other embodiments, from about 0.5% to about 22%; and in other embodiments, from about 0.5% to about 20%. In particular embodiments, the propylene-based rubbery copolymer has a crystallinity of 0%.

In one or more embodiments, the propylene-based rubbery copolymer can have a density of about 0.85 g/cm$^3$ to about 0.92 g/cm$^3$; in other embodiments, about 0.87 g/cm$^3$ to 0.90 g/cm$^3$; and in other embodiments, from about 0.88 g/cm$^3$ to about 0.89 g/cm$^3$ at room temperature, as measured per the ASTM D-792 test method.

In one or more embodiments, the propylene-based rubbery copolymer can have a melt index (MI) (ASTM D-1238, 2.16 kg @ 190° C.), of less than 10 dg/min; in other embodiments, ≤6.5 dg/min; in other embodiments, ≤6 dg/min; in other embodiments, ≤5.5 dg/min; and in other embodiments, ≤5 dg/min.

In one or more embodiments, the propylene-based rubbery copolymer can have a melt flow rate (MFR) (ASTM D-1238, 2.16 kg @ 230° C.), ≥0.2 dg/min; in other embodiments, of at least 0.2 dg/min; in other embodiments, at least 0.5 dg/min; and in other embodiments, at least 1.0 dg/min. In these or other embodiments, the melt flow rate may be ≤350 dg/min; and in other embodiments, <100 dg/min. In an embodiment, the propylene-based polymer has MFR of 0.5 dg/min to 350 dg/min; in other embodiments, from 2 dg/min to 30 dg/min; in other embodiments, from 5 dg/min to 30 dg/min; in other embodiments, 10 dg/min to 30 dg/min; and in other embodiments, 10 dg/min to about 25 dg/min.

In one or more embodiments, the propylene-based rubbery copolymers may have a Mooney viscosity [ML (1+4)@125° C.], as determined according to ASTM D-1646, of <100; in other embodiments, <75; in other embodiments, <60; and in other embodiments, less than 30.

In one or more embodiments, the propylene-based rubbery copolymer can have a $M_W$ of about 5,000 g/mole to about 5,000,000 g/mole; in other embodiments, a $M_W$ of about 10,000 g/mole to about 1,000,000 g/mole; in other embodiments, a $M_W$ of about 20,000 g/mole to about 500,000 g/mole; and in other embodiments, a $M_W$ of about 50,000 g/mole to about 400,000 g/mole.

In one or more embodiments, the propylene-based rubbery copolymer can have a $M_n$ of about 2,500 g/mole to about 2,500,000 g/mole; in other embodiments, a $M_n$ of about 5,000 g/mole to about 500,000 g/mole; in other embodiments, a $M_n$ of about 10,000 g/mole to about 250,000 g/mole; and in other embodiments, a $M_n$ of about 25,000 g/mole to about 200,000 g/mole.

In one or more embodiments, the propylene-based rubbery copolymer can have a Z-average molecular weight ($M_Z$) of about 10,000 g/mole to about 7,000,000 g/mole; in other embodiments, a $M_Z$ of about 50,000 g/mole to about 1,000,000 g/mole; in other embodiments, a $M_Z$ of about 80,000 g/mole to about 700,000 g/mole; and in other embodiments, a $M_Z$ of about 100,000 g/mole to about 500,000 g/mole.

In one or more embodiments, the molecular weight distribution index (MWD=($M_w/M_n$)) of the propylene-based rubbery copolymer may be about 1 to about 40; in other embodiments, about 1 to about 5; in other embodiments, about 1.8 to about 5; and in other embodiments, about 1.8 to about 3.

d. Butyl Rubber

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinylstyrene. Exemplary alkyl substituted vinyl aromatic monomers include α-methylstyrene and paramethylstyrene. These copolymers and terpolymers may also be halogenated such as in the case of chlorinated and brominated butyl rubber. In one or more embodiments, these halogenated polymers may derive from monomer, such as parabromomethylstyrene.

In one or more embodiments, butyl rubber includes copolymers of isobutylene and isoprene, and copolymers of isobutylene and paramethyl styrene, terpolymers of isobutylene, isoprene, and vinylstyrene, branched butyl rubber, and brominated copolymers of isobutene and paramethylstyrene (yielding copolymers with parabromomethylstyrenyl mer units). These copolymers and terpolymers may be halogenated.

In one embodiment, where butyl rubber includes the isobutylene-isoprene copolymer, the copolymer may include from about 0.5 to about 30 or from about 0.8 to about 5, percent by weight isoprene based on the entire weight of the copolymer with the remainder being isobutylene.

In another embodiment, where butyl rubber includes isobutylene-paramethylstyrene copolymer, the copolymer may include from about 0.5 to about 25 and from about 2 to about 20, percent by weight paramethylstyrene based on the entire weight of the copolymer with the remainder being isobutylene. In one embodiment, isobutylene-paramethyl styrene copolymers can be halogenated, such as with bromine, and these halogenated copolymers can contain from about 0 to about 10 percent by weight, or from about 0.3 to about 7 percent by weight halogenation.

In other embodiments, where butyl rubber includes isobutylene-isoprene-divinylbenzene, the terpolymer may include from about 95 to about 99, or from about 96 to about 98.5, percent by weight isobutylene, and from about 0.5 to about 5, or from about 0.8 to about 2.5, percent by weight isoprene based on the entire weight of the terpolymer, with the balance being divinylbenzene.

In the case of halogenated butyl rubbers, the butyl rubber may include from about 0.1 to about 10, or from about 0.3 to about 7, or from about 0.5 to about 3 percent by weight halogen based upon the entire weight of the copolymer or terpolymer.

In one or more embodiments, the $T_g$ of useful butyl rubber can be less than about −55° C., or less than about −58° C., or less than about −60° C., or less than about −63° C.

In one or more embodiments, the Mooney viscosity ($ML_{1+8}$@125° C.) of useful butyl rubber can be from about 25 to about 75, or from about 30 to about 60, or from about 40 to about 55.

Butyl rubber can be obtained from a number of commercial sources as disclosed in the Rubber World Blue Book. For example, both halogenated and non-halogenated copolymers of isobutylene and isoprene are available under the tradename ExxonMobil Butyl (ExxonMobil Chemical Co.), halogenated and non-halogenated copolymers of isobutylene and paramethylstyrene are available under the tradename EXXPRO specialty elastomers (ExxonMobil Chemical Co.), star branched butyl rubbers are available under the tradename Star Branched Butyl (ExxonMobil Chemical Co.), and copolymers containing parabromomethylstyrenyl mer units are available under the tradename EXXPRO 3745 (ExxonMobil Chemical Co.). Halogenated and non-halogenated terpolymers of isobutylene, isoprene, and divinylstyrene are available under the tradename Polysar™ Butyl (Lanxess; Germany).

e. Plastic

The thermoplastic polymers, which may also be referred to as a thermoplastic resins, that can be employed to form the thermoplastic phase include those thermoplastic polymers that have been employed in the manufacture of thermoplastic vulcanizates as taught in the art. For example, these thermoplastic polymers, which may be referred to as thermoplastic resins or unfunctionalized thermoplastics, may include solid, generally high molecular weight plastic resins. Exemplary thermoplastic polymers include crystalline, semi-crystalline, and crystallizable polyolefins, olefin copolymers, and non-olefin resins.

The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to about 30% by weight of the polymer. For example, see U.S. Pat. No. 6,867,260 B2. Copolymers available under the tradename VISTAMAXX (ExxonMobil Chemical Co.) are specifically included. Other polyolefin copolymers may include copolymers of olefins with styrene such as styrene-ethylene copolymer or polymers of olefins with α,β-unsaturated acids, α,β-unsaturated esters, such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics, such as described herein, or with other polymeric modifiers, are also suitable in accordance with this invention. Useful thermoplastic polymers may also include impact and reactor copolymers.

In one or more embodiments, the thermoplastic resins include propylene-based polymers including those solid, generally high-molecular weight plastic resins that primarily comprise units deriving from the polymerization of propylene. In certain embodiments, at least 75%; in other embodiments, at least 90%; in other embodiments, at least 95%; and in other embodiments, at least 97% of the units of the propylene-based polymer derive from the polymerization of propylene. In particular embodiments, these polymers include homopolymers of propylene.

In certain embodiments, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof.

In one or more embodiments, propylene-based polymers may include semi-crystalline polymers. In one or more embodiments, these polymers may be characterized by a crystallinity of at least 25% by weight; in other embodiments, at least 55% by weight; in other embodiments, at least 65%; and in other embodiments, at least 70% by weight. Crystallinity may be determined by dividing the heat of fusion of a sample by the heat of fusion of a 100% crystalline polymer, which is assumed to be 209 J/g for polypropylene. In one or more embodiments, these polymers may be characterized by an Hf of at least 52.3 J/g; in other embodiments, in excess of 100 J/g; in other embodiments, in excess of 125 J/g; and in other embodiments, in excess of 140 J/g.

In one or more embodiments, useful propylene-based polymers may be characterized by an $M_W$ of from about 50 Kg/mole to about 2,000 kg/mole; and in other embodiments, from about 100 kg/mole to about 600 kg/mole. They may also be characterized by a $M_n$ of about 25 kg/mole to about 1,000 kg/mole; and in other embodiments, about 50 kg/mole to about 300 kg/mole, as measured by GPC with polystyrene standards.

In one or more embodiments, useful propylene-based polymers can have a MFR (ASTM D-1238, 2.16 kg @ 230° C.) of less than 100 dg/min; in other embodiments, less than 50 dg/min; in other embodiments, less than 10 dg/min; and in other embodiments, less than 5 dg/min. In these or other embodiments, the propylene-based polymers can have a MFR of at least 0.1 dg/min; in other embodiments, 0.2 dg/min; and in other embodiments, at least 0.5 dg/min.

In one or more embodiments, useful propylene-based polymers can have a melt temperature ($T_m$) that is from about 110° C. to about 170° C.; in other embodiments, from about 140° C. to about 168° C.; and in other embodiments, from about 160° C. to about 165° C. They may have a glass transition temperature ($T_g$) of from about −10° C. to about 10° C.; in other embodiments, from about −3° C. to about 5° C.; and in other embodiments, from about 0° C. to about 2° C. In one or more embodiments, they may have a crystallization temperature ($T_c$) of at least about 75° C.; in other embodiments, at least about 95° C.; in other embodiments, at least about 100° C.; and in other embodiments, at least 105° C., with one embodiment ranging from 105° C. to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In particular embodiments, the propylene-based polymers include a homopolymer of a high-crystallinity isotactic or syndiotactic polypropylene. This polypropylene can have a density of from about 0.89 g/cc to about 0.91 g/cc, with the largely isotactic polypropylene having a density of from about 0.90 g/cc to about 0.91 g/cc. Also, high and ultrahigh molecular weight polypropylene that has a fractional melt flow rate can be employed. In one or more embodiments, polypropylene resins may be characterized by a MFR (ASTM D-1238; 2.16 kg @ 230° C.) that is less than or equal to 10 dg/min; in other embodiments, less than or equal to 1.0 dg/min; and in other embodiments, less than or equal to 0.5 dg/min.

f. Oils

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole; and in other embodiments, from about 700 g/mole to about 1,300 g/mole. In one or more embodiments, these oligomers include isobutenyl mer units. Exemplary synthetic oils include polyisobutylene, poly (isobutylene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils include synthetic polymers or copolymers having a viscosity in excess of about 20 cp; in other embodiments, in excess of about 100 cp; and in other embodiments, in excess of about 190 cp, where the viscosity is measured by a Brookfield viscometer according to ASTM D-4402 at 38° C. In these or other embodiments, the viscosity of these oils can be less than 4,000 cp; and in other embodiments, less than 1,000 cp.

Useful synthetic oils can be commercially obtained under the tradenames Polybutene™ (Soltex; Houston, Tex.), and Indopol™ (Innouvene). White synthetic oil is available under the tradename SPECTRASYN™ (ExxonMobil Chemical Co.), formerly SHF Fluids (Mobil). Oils described in U.S. Pat. No. 5,936,028 may also be employed. It is believed that synthetic oils may provide enhanced low temperature performance. Also, high temperature performance may be enhanced based upon molecular structure.

In one or more embodiments, the extender oils may include organic esters, alkyl ethers, or combinations thereof including those disclosed in U.S. Pat. Nos. 5,290,866 and 5,397,832, which are incorporated herein by reference. In one or more embodiments, the organic esters and alkyl ether esters may have a molecular weight that is generally less than about 10,000. In one or more embodiments, suitable esters include monomeric and oligomeric materials having an average molecular weight of below about 2,000; and in other embodiments, below about 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively, oligomeric aliphatic esters or alkyl ether esters. In one or more embodiments, the thermoplastic vulcanizates are devoid of polymeric aliphatic esters and aromatic esters, as well as phosphate esters.

g. Polymeric Processing Additives

In certain embodiments, the thermoplastic vulcanizate may include a polymeric processing additive. The processing additive may be a polymeric resin that has a very high melt flow index. These polymeric resins include both linear and branched polymers that have a melt flow rate that is greater than about 500 dg/min; in other embodiments, greater than about 750 dg/min; in other embodiments, greater than about 1,000 dg/min; in other embodiments, greater than about 1,200 dg/min, and in other embodiments, greater than about 1,500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. Thermoplastic vulcanizates that include similar processing additives are disclosed in U.S. Pat. No. 6,451,915.

h. Other Constituents

In addition to the rubber, thermoplastic resins, and optional processing additives, the thermoplastic vulcanizates of the invention may optionally include one or more processing oils (aromatic, paraffinic and napthathenic mineral oils), compatabilizers, calcined clay, kaolin clay, nanoclay, talc, silicates, carbonates, sulfates, carbon black, sand, glass beads, mineral aggregates, wollastonite, mica, glass fiber, other filler, pigments, colorants, dyes, carbon black, dispersants, flame retardants, antioxidants, conductive particles, UV-inhibitors, UV-stabilizers, adhesion promoters, fatty acids, esters, paraffin waxes, neutralizers, metal deactivators, tackifiers, calcium stearate, dessicants, stabilizers, light stabilizer, light absorber, coupling agents including silanes and titanates, plasticizers, lubricants, blocking agents, antiblocking agents, antistatic agents, waxes, foaming agents, nucleating agents, slip agents, acid scavengers, lubricants, adjuvants, surfactants, crystallization aids, polymeric additives, defoamers, preservatives, thickeners, rheology modifiers, humectants, vulcanizing/cross-linking/curative agents, vulcanizing/cross-linking/curative accelerators, cure retarders, reinforcing and non-reinforcing fillers and combinations thereof and other processing aids known in the rubber compounding art. These additives can comprise up to about 50 wt. % of the total composition. Fillers and extenders that can be utilized include conventional inorganics such as calcium carbonate, clays, silica, talc, titanium dioxide, carbon black and the like.

i. Amounts

In one or more embodiments, the thermoplastic vulcanizates of this invention may contain a sufficient amount of the rubber to form rubbery compositions of matter. The skilled artisan will understand that rubbery compositions of matter include those that have ultimate elongations greater than 100%, and that quickly retract to 150% or less of their original length within about 10 minutes after being stretched to 200% of their original length and held at 200% of their original length for about 10 minutes.

Thus, in one or more embodiments, the thermoplastic vulcanizates can include at least about 25 wt. %; in other embodiments, at least about 45 wt. %; in other embodiments, at least about 65 wt. %; and in other embodiments, at least about 75 wt. % of rubber (i.e., dynamically-vulcanized rubber) based upon the total weight of the thermoplastic vulcanizates. In these or other embodiments, the amount of rubber within the thermoplastic vulcanizates can be from about 15 wt. % to about 90 wt. %; in other embodiments, from about 45 wt. % to about 85 wt. %; and in other embodiments, from about 60 wt. % to about 80 wt. %, based on the entire weight of the rubber and thermoplastic combined.

In one or more embodiments, the amount of thermoplastic polymer (i.e., uncured polymer within the thermoplastic phase) within the thermoplastic vulcanizates can be from about 10 wt. % to about 85 wt. %; in other embodiments, from about 10 wt. % to about 40 wt. %; and in other embodiments, from about 12 wt. % to about 30 wt. %, based on the entire weight of the rubber and thermoplastic combined. In these or other embodiments, the amount of thermoplastic polymer within the thermoplastic vulcanizates may be from about 25 parts by weight to about 250 parts by weight; in other embodiments, from about 50 parts by weight to about 150 parts by weight; and in other embodiments, from about 60 parts by weight to about 100 parts by weight thermoplastic polymer per 100 parts by weight rubber.

With respect to the oil, the thermoplastic vulcanizate may include from about 25 parts by weight to about 250 parts by weight, or from about 50 parts by weight to about 150 parts by weight, or from about 75 parts by weight to about 130 parts by weight, of extender oil per 100 parts rubber. The quantity of extender oil added may depend upon the properties desired, with the upper limit depending upon the compatibility of the particular oil and blend ingredients; this limit is exceeded when excessive exuding of extender oil occurs. The amount of extender oil may depend, at least in part, upon the type of rubber. High viscosity rubbers are more highly oil extendable.

Fillers, such as carbon black, clay, talc, or calcium carbonate may be added in amount from about 1 to about 250 parts by weight; in other embodiments, from about 10 parts by weight to about 150 parts by weight; and in other embodiments, from about 25 parts by weight to about 50 parts by weight, per 100 parts by weight of rubber. The amount of carbon black that can be used may depend, at least in part, upon the type of carbon black and the amount of extender oil that is used.

j. Curatives

Thermoplastic vulcanizates may be dynamically vulcanized by employing conventional cure systems. Examples include phenolic resin cure systems, silicon-containing cure systems, and peroxide cure systems (i.e., free-radical cure systems). In particular embodiments, a non-peroxide cure system is employed including phenolic resin cure systems or silicon-containing cure systems, or in the case of butyl rubber, a curative effective for crosslinking the butyl rubber.

Useful phenolic cure systems are disclosed in U.S. Pat. Nos. 2,972,600, 3,287,440, 5,952,425 and 6,437,030. In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 carbon atom to about 10 carbon atoms. Dimethylolphenols or phenolic resins, substituted in para-positions with alkyl groups containing 1 carbon atom to about 10 carbon atoms may be employed. In one embodiment, a blend of octylphenol-formaldehyde and nonylphenol-formaldehyde resins are employed. The blend includes from about 25 wt. % to about 40 wt. % octylphenol-formaldehyde and from about 75 wt. % to about 60 wt. % nonylphenol-formaldehyde; in other embodiments, the blend includes from about 30 wt. % to about 35 wt. % octylphenol-formaldehyde; and from about 70 wt. % to about 65 wt. % nonylphenol-formaldehyde. In one embodiment, the blend includes about 33 wt. % octylphenol-formaldehyde and about 67 wt. % nonylphenol-formaldehyde resin, where each of the octylphenol-formaldehyde and nonylphenol-formaldehyde include methylol groups. This blend can be solubilized in paraffinic oil at about 30% solids without phase separation.

Useful phenolic resins may be obtained under the tradenames SP-1044, SP-1045 (Schenectady International; Schenectady, N.Y.), which may be referred to as alkylphenol-formaldehyde resins. SP-1045 is believed to be a blend of octylphenol and nonylphenol formaldehyde resins that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a phenolic resin curative includes that defined according to the general formula

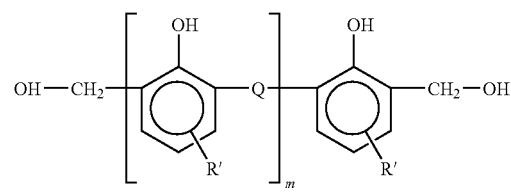

where Q is a divalent radical selected from the group consisting of —$CH_2$—, —$CH_2$—O—$CH_2$—; m is zero or a positive integer from 1 to 20, and R' is an organic group. In one embodiment, Q is the divalent radical —$CH_2$—O—$CH_2$—, m is zero or a positive integer from 1 to 10, and R' is an organic group having less than 20 carbon atoms. In other embodiments, m is zero or a positive integer from 1 to 10, and R' is an organic radical having between 4 carbon atoms and 12 carbon atoms.

In one or more embodiments, the phenolic resin is used in conjunction with a cure accelerator such as stannous chloride, and metal oxide such as zinc oxide, which is believed to function as a scorch retarder and acid scavenger and/or polymer stabilizer. Useful zinc oxide includes that conventionally employed for rubber processing. In one or more embodiments, the zinc oxide can have a mean particle diameter of about 0.05 µm to about 0.15 µm. Useful zinc oxide can be obtained commercially under the tradename Kadox™ 911 (Horsehead Corp.). In these or other embodiments, the phenolic resin can be used in conjunction with an acid scavenger, such as a hydrotalcite, which may be added downstream of cure.

In one or more embodiments, the phenolic resin may be employed in an amount from about 2 parts by weight to about 6 parts by weight; in other embodiments, from about 3 parts by weight to about 5 parts by weight; and in other embodiments, from about 4 parts by weight to about 5 parts by weight per 100 parts by weight of rubber. A complementary amount of stannous chloride may include from about 0.5 parts by weight to about 2.0 parts by weight; in other embodiments, from about 1.0 parts by weight to about 1.5 parts by weight; and in other embodiments, from about 1.2 parts by weight to about 1.3 parts by weight per 100 parts by weight of rubber. In conjunction therewith, from about 0.1 parts by weight to about 6.0 parts by weight; in other embodiments, from about 1.0 parts by weight to about 5.0 parts by weight; and in other embodiments, from about 2.0 parts by weight to about 4.0 parts by weight of zinc oxide may be employed. In one or more embodiments, the olefinic rubber employed with the phenolic curatives includes diene units deriving from 5-ethylidene-2-norbornene.

Free-radical cure agents include peroxides such as organic peroxides. Examples of organic peroxides include, but are not limited to, di-tert-butyl peroxide, dicumyl peroxide, t-butyl-cumyl peroxide, α,α-bis(tert-butylperoxfy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Others include azo initiators including Luazo™ AP (ARCHEMA). Useful peroxides and their methods of use in dynamic vulcanization of thermoplastic vulcanizates are disclosed in U.S. Pat. No. 5,656,693, which is incorporated herein by reference for purposes of U.S. patent practice. In certain embodiments, cure systems, such as those described in U.S. Pat. No. 6,747,099, U.S. Pat. No. 7,226,964, and International Patent Publication Nos. WO 02/28946, WO 02/077089, and WO 2005/092966, may also be employed.

In one or more embodiments, the free-radical cure agent may be employed in conjunction with one or more coagents. Coagents may include high-vinyl polydiene or polydiene copolymer, triallylcyanurate, triallyl isocyanurate, triallyl phosphate, sulfur, N,N'-m-phenylenedimaleimide, N,N'-p-phenylenedimaleimide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multi-functional acrylates, multi-functional methacrylates, or oximers such as quinone dioxime. Combinations of these coagents may be employed. For example, combinations of high-vinyl polydienes and α-β-ethylenically unsaturated metal carboxylates are useful, as disclosed in U.S. Patent Application Publication No. 2007/0021564. Coagents may also be employed as neat liquids or together with a carrier. For example, the multi-functional acrylates or multi-functional methacrylates together with a carrier are useful, as disclosed in U.S. Patent Application Publication No. 2007/0083008. Also, the curative and/or coagent may be pre-mixed with the plastic prior to formulation of the thermoplastic vulcanizate, as described in U.S. Pat. No. 4,087,485.

The skilled artisan will be able to readily determine a sufficient or effective amount of curative and/or coagent to be employed without undue calculation or experimentation. Those skilled in the art appreciate that the amount of curative employed may vary based upon the chemical nature of the peroxide and/or coagent employed. In these or other embodiments, the amount of curative employed may vary based upon the type of rubber employed, as well as the cross-linkable units present within the rubber.

Silicon-containing cure systems may include silicon hydride compounds having at least two SiH groups. Silicon hydride compounds that are useful in practicing the present invention include, but are not limited to, methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and mixtures thereof.

Useful catalysts for hydrosilylation include, but are not limited to, transition metals of Group VIII. These metals include, but are not limited to, palladium, rhodium, and platinum, as well as complexes of these metals. Useful silicon-containing curatives and cure systems are disclosed in U.S. Pat. No. 5,936,028.

In one or more embodiments, the silane-containing compounds may be employed in an amount from about 0.5 parts by weight to about 5.0 parts by weight; in other embodiments, from about 1.0 parts by weight to about 4.0 parts by weight; and in other embodiments, from about 2.0 parts by weight to about 3.0 parts by weight per 100 parts by weight of rubber. A complementary amount of catalyst may include from about 0.5 parts to about 20.0 parts; in other embodiments, from about 1.0 parts to about 5.0 parts; and in other embodiments, from about 1.0 parts to about 2.0 parts of metal per million parts by weight of the rubber. In one or more embodiments, the olefinic rubber employed with the hydrosilylation curatives includes diene units deriving from 5-vinyl-2-norbornene.

Where butyl rubber is employed in preparing the thermoplastic vulcanizate, the cure systems may include phenolic resins, silicon-containing cure systems, zinc oxide systems, or amine systems. These cure systems are described in U.S. Pat. Nos. 5,013,793, 5,100,947, 5,021,500, 4,978,714, and 4,810,752.

III. Preparation of TPV

As is known in the art, thermoplastic vulcanizates may be prepared by dynamic vulcanization of the rubber in the presence of a non-vulcanizing thermoplastic polymer. Dynamic vulcanization includes a vulcanization or curing process for a rubber within a blend with a thermoplastic resin, where the rubber may be crosslinked or vulcanized under conditions of high shear at a temperature above the melting point of the thermoplastic. In one embodiment, the rubber can be simultaneously crosslinked and dispersed as fine particles within the thermoplastic matrix, although other morphologies may also exist.

In one or more embodiments, dynamic vulcanization can be effected by employing a continuous process. Continuous processes may include those processes where dynamic vulcanization of the rubber is continuously achieved, thermoplastic vulcanizate product is continuously removed or collected from the system, and/or one or more raw materials or ingredients are continuously fed to the system during the time that it may be desirable to produce or manufacture the product.

In one or more embodiments, continuous dynamic vulcanization can be effected within a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruder). Methods and equipment for continuously preparing thermoplastic vulcanizates are described in U.S. Pat. Nos. 4,311,628, 4,594,390, 5,656,693, 6,147,160, and 6,042,260, as well as International Patent Publication No. WO 2004/009327 A1, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed. In particular embodiments, oil is introduced to the mixture. In certain embodiments, the addition of sufficient oil allows for the achievement of particular advantageous properties of the thermoplastic vulcanizate.

In one or more embodiments, the rubber is advantageously completely or fully cured. The degree of cure can be measured by determining the amount of rubber that is extractable from the thermoplastic vulcanizate by using cyclohexane or boiling xylene as an extractant. These methods are disclosed in U.S. Pat. No. 4,311,628. Preferably, the rubber has a degree of cure where less than 15 wt. %, more preferably less than 10 wt. %, even more preferably less than 5 wt. %, and still more preferably less than 3 wt. % of the rubber is extractable by cyclohexane at 23° C., as described in U.S. Pat. Nos. 5,100,947 and 5,151,081, which are incorporated herein by reference. Alternatively, the rubber has a degree of cure such that the crosslink density is preferably at least $4 \times 10^{-5}$; more preferably, at least $7 \times 10^{-5}$; and still more preferably, at least $10 \times 10^{-5}$ moles per milliliter of rubber. See also, Ellul et al, "Crosslink Densities and Phase Morphlgies in Dynamically Vulcanized TPEs," *Rubber Chemistry and Technology*, Vol. 68, pp. 573-584 (1995).

IV. Treatment with Free-Radical

According to one or more embodiments of the present invention, thermoplastic vulcanizate compositions are treated with a free-radical source while the thermoplastic vulcanizate composition is in its molten state. In one or more embodiments, the thermoplastic vulcanizate composition undergoes mixing and/or masticating while being introduced to the free-radical source.

a. Free-Radical Source

In one or more embodiments, the free-radical source may include peroxides such as organic peroxides. Examples of organic peroxides include, but are not limited to, di-tert-butyl peroxide, dicumyl peroxide, t-butylcumyl peroxide, α,α-bis(tert-butylperoxfy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Others include azo initiators including Luazo™ AP (ARCHEMA). Useful peroxides and their methods of use in dynamic vulcanization of thermoplastic vulcanizates are disclosed in U.S. Pat. No. 5,656,693, which is incorporated herein by reference for purposes of U.S. patent practice. In certain embodiments, cure systems, such as those described in U.S. Pat. Nos. 6,747,099 and 7,226,964, and International Patent Publication Nos. WO 02/28946, WO 02/077089, and WO 2005/092966, may also be employed.

b. Loading

In one or more embodiments, the amount of the free-radical source (e.g., peroxide) introduced with the thermoplastic vulcanizate can be described quantitatively with respect to the weight of the thermoplastic vulcanizate composition. In other words, the loading of the free-radical source can be described in parts by weight per million parts by weight of the thermoplastic vulcanizate, which may simply be referred to as parts per million (ppm). In one or more embodiments, at least 100 ppm; in other embodiments, at least 200 ppm; in other embodiments, at least 300 ppm; and in other embodiments, at least 400 ppm free-radical source is introduced with the thermoplastic vulcanizate. In these or other embodiments, less than 1,000 ppm; in other embodiments, less than 900 ppm; in other embodiments, less than 800 ppm; and in other embodiments, less than 700 ppm free-radical source is introduced with the thermoplastic vulcanizate.

c. Process Conditions

In one or more embodiments, the temperature at which the free-radical source is introduced with the thermoplastic vulcanizate is a temperature above the glass transition temperature of the plastic phase of the thermoplastic vulcanizate. In other words, the thermoplastic vulcanizate is itself at a temperature above the glass transition temperature of the plastic phase of the thermoplastic vulcanizate. In certain embodiments, the temperature of the thermoplastic vulcanizate composition is above the melt temperature of the plastic phase of the thermoplastic vulcanizate.

In one or more embodiments, the temperature of the thermoplastic vulcanizate composition when introduced with the free-radical source is at least 150° C.; in other embodiments, at least 160° C.; and in other embodiments, at least 180° C. In these or other embodiments, the temperature of the thermoplastic vulcanizate when introduced with the free-radical source is less than 300° C.; in other embodiments, less than 250° C.; and in other embodiments, less than 220° C.

In one or more embodiments, the thermoplastic vulcanizate composition and the free-radical source are introduced while the thermoplastic vulcanizate composition undergoes mixing and/or masticating. This may occur by using batch or continuous processes. This mixing and/or masticating may take place within any conventional mixing apparatus employed in the rubber or thermoplastic art. In one or more embodiments, the introduction of the thermoplastic vulcanizate composition and the free-radical source takes place within a reactive extruder. For example, the thermoplastic vulcanizate composition and the free-radical source may be introduced within a single-screw, twin-screw extruder, or ring extruder.

Following modification caused by addition of the free-radical source, further manufacturing and processing of the thermoplastic vulcanizate may proceed in a conventional manner. For example, the molten thermoplastic vulcanizate composition may be cooled and/or solidified and subsequently pelletized for future storage and/or shipment. Practice of the present invention is not necessarily limited by the manner in which the thermoplastic vulcanizate composition is subsequently solidified or fabricated.

V. Two-Stage Procedure

In one or more embodiments, the introduction of the thermoplastic vulcanizate with the free-radical source occurs subsequent to dynamic vulcanization of thermoplastic vulcanizate but prior to solidification of thermoplastic vulcanizate composition. In other words, the thermoplastic vulcanizate composition can be formed within a first stage of a procedure where dynamic vulcanization occurs, the free-radical source can be introduced with the thermoplastic vulcanizate composition following dynamic vulcanization within a second stage of the procedure, and the thermoplastic vulcanizate composition is maintained in a molten state between the first and second stages of the procedure.

In one or more embodiments, the blend that is dynamically vulcanized in the first stage preferably includes a greater volume fraction of rubber than thermoplastic resin. As a result, the thermoplastic resin is present as a discontinuous phase. As dynamic vulcanization proceeds, the viscosity of the rubber increases and phase inversion occurs. In other words, the thermoplastic resin phase becomes continuous. In one embodiment, the rubber becomes a discontinuous phase. In another embodiment, a co-continuous morphology is achieved where both the rubber and the thermoplastic resin are continuous phases. Once phase inversion is achieved and the rubber is at least partially cured (i.e., the thermoplastic resin becomes a continuous phase), the first stage ends.

Within the second stage, which begins immediately after phase inversion is achieved, the free-radical source can be added to the product of the first stage, i.e., the phase-inverted blend or first-stage thermoplastic vulcanizate. Accordingly, the free-radical source can be added as soon as phase inversion is achieved, or it can be added later in time, so long as the product of the first stage remains in the melt. Although several factors, such as the mixing intensity, the degree of cure, and the ratio of thermoplastic resin to rubber, can impact the time at which the inversion occurs, those skilled in the art appreciate that, under conventional conditions, phase inversion of compositions where rubber is the major volume fraction component relative to the thermoplastic component will typically occur once at least about 50% to about 75% of the curative required to achieve a full cure of the rubber is consumed, although as noted above, full cure of the rubber is not required for practicing this invention.

In one embodiment, the free-radical source is added after the desired cure is achieved. In other words, the additional free-radical source is not added until the targeted cure level is achieved or the curative added in the first stage is substantially consumed, which generally refers to greater than about 90% consumption of the curative required to achieve full cure of the rubber.

In another embodiment, the free-radical source is added in incremental additions. While these incremental additions are made after phase inversion, they can be made before, after, or both before and after full cure or complete or substantial curative consumption is achieved.

In particular embodiments, both stages of the procedure take place within a single reactive extruder. For example, dynamic vulcanization may take place within a reactive extruder and a free-radical source may be introduced into the reactive extruder at a location downstream of the location of dynamic vulcanization.

In one or more embodiments, the process of the present invention includes the step or steps of introducing additional thermoplastic vulcanizate constituents after phase inversion. For example, and as has been practiced in the prior art, additional thermoplastic resin and/or oil can be added to the thermoplastic vulcanizate after phase inversion. These additional thermoplastic vulcanizate constituents can be added together with or separately from the free-radical source. In one or more embodiments, the free-radical source is added to the thermoplastic vulcanizate together with an oil.

VI. Industrial Applicability

The thermoplastic vulcanizate compositions of the present invention have a variety of uses as is known in the art. Practice of the present invention does not necessarily limit the intended or expected uses of the thermoplastic vulcanizates. As is known in the art, thermoplastic elastomers of this invention are useful for making a variety of articles such as weather seals, hoses, belts, gaskets, moldings, boots, elastic fibers and like articles. They are useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

In one or more embodiments, the processes of the present invention are particularly useful for forming thermoplastic vulcanizates that can advantageously be employed to prepare extruded articles with desirable surface appearance including desirable surface smoothness. In particular embodiments, these thermoplastic vulcanizates are relatively soft (e.g., shore A hardness below 50) and therefore the ability to achieve technologically useful surface appearance is highly advantageous and unexpectedly surprising.

VII. Specific Embodiments

A process for preparing modified thermoplastic vulcanizate compositions, the process comprising the steps of introducing molten thermoplastic vulcanizate and a free-radical source, where the thermoplastic vulcanizate includes cured rubber dispersed within a thermoplastic matrix.

The embodiment of paragraph 109, where the thermoplastic vulcanizate is prepared by dynamically vulcanizing a rubber with a non-peroxide cure system.

The embodiment of paragraphs 109-110, where the free-radical source includes a peroxide.

A continuous process for preparing thermoplastic vulcanizates, the process comprising the steps of (i) dynamically vulcanizing a rubber in a first stage of the process to form a thermoplastic vulcanizate that is in a molten state, (ii) maintaining the thermoplastic vulcanizate in a molten state until a second stage, and (iii) introducing the molten thermoplastic vulcanizate and a free-radical source in the second stage of the process to form a modified thermoplastic vulcanizate.

The embodiment of paragraph 112, further comprising the step of cooling the thermoplastic vulcanizate.

The embodiment of paragraphs 112-113, further comprising the step of fabricating the thermoplastic vulcanizate into a desired shape.

The embodiment of paragraphs 112-114, where said step of dynamically vulcanizing a rubber includes dynamically vulcanizing a rubber that is undergoing mixing with a polyolefin or olefin copolymer thermoplastic resin.

The embodiment of paragraphs 112-115, where said step of dynamically vulcanizing includes curing a rubber with a non-peroxide curative.

The embodiment of paragraphs 112-116, where said first stage and said second stage of the process take place within a single reactive extruder.

The embodiment of paragraphs 112-116, where said first stage and said second stage of the process take place in separate extruders.

The embodiment of paragraphs 112-118, where said rubber is an olefinic elastomeric copolymer and said thermoplastic resin is a propylene-based polyolefin.

The embodiment of paragraph 112-119, where the free-radical source includes a peroxide.

The embodiment of paragraph 120, where the peroxide is selected from the group consisting of di-tert-butyl peroxide, dicumyl peroxide, t-butylcumyl peroxide, α,α-bis(tert-butylperoxfy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof.

The embodiment of paragraph 120, where the peroxide is selected from the group consisting of diaryl peroxides, ketone peroxides, peroxydicarbonates, peroxyesters, dialkyl peroxides, hydroperoxides, peroxyketals and mixtures thereof.

The embodiment of paragraph 1209, where the peroxide is an azo initiator.

A process for producing thermoplastic vulcanizates, the process comprising the steps of (i) introducing rubber and thermoplastic resin into a reactive extruder, (ii) introducing a curative into the reactive extruder at a location downstream of the location of said introducing rubber and thermoplastic resin, (iii) mixing the rubber, the thermoplastic resin, and the curative, (iv) allowing said curative to cure the rubber and thereby cause phase inversion of the rubber within the thermoplastic resin, and (v) introducing a free-radical source into the reactive extruder at a location downstream of the phase inversion of the rubber, thereby modifying the thermoplastic resin.

In order to demonstrate the practice of the present invention, the following examples have been prepared and tested. The examples should not, however, be viewed as limiting the scope of the invention. The claims will serve to define the invention.

EXAMPLES

Samples 1-4

Thermoplastic vulcanizate compositions were prepared within a production-grade twin-screw extruder by employing methods similar to those described in U.S. Pat. No. 4,594,390. The ingredients employed to prepare the thermoplastic vulcanizate compositions are provided in Table I, which sets forth each of the ingredients in parts by weight.

TABLE I

| Ingredient | Amount |
|---|---|
| EPDM Rubber | 100 |
| Polypropylene | 15.45 |
| Process Oil | 35.48 |
| Phenolic Resin | 4.24 |
| Catalyst | 0.68 |
| Carbon Black Concentrate | 13.75 |

The elastomeric copolymer was poly(ethylene-co-propylene-co-5-ethylidene-2-norbornene) characterized by having a diene content of about 3.9 wt. %, a Mooney viscosity $ML_{(1+4)}@125°$ C. of about 52 (oil extended), an intrinsic viscosity (dl/g) in decalin at 135° C. of about 4 dl/g, a weight average molecular weight of about 850 kg/mole, a number average molecular weight of about 170 kg/mole, an ethylene content of about 64 wt. %, a paraffinic oil content of 75 phr (the parts by weight in Table I referring to the amount of rubber and paraffinic oil) and was obtained under the tradename VISTALON V3666 (ExxonMobil Chemical Co.). The phenolic resin was a resole-type resin, including a blend of octylphenol and nonylphenol formaldehyde dispersed in paraffinic oil. The polypropylene was obtained under the tradename PP534-1 (ExxonMobil Chemical Co.) and/or F008F (Sunoco), and was characterized by a 0.8 MFR. The extender oil was paraffinic oil obtained under the tradename Sunpar™ 150M (Sunoco). The black concentrate was a commercial blend including 40% carbon black and polypropylene, which was obtained under the tradename 49974 (Ampacet).

All of the ingredients, except of the cure package, which included the phenolic resin and catalyst, were added into the feed throat of the extruder. The cure package was added at a point that can be described as 8.8 L/D, which refers to a location along the length of the extruder located at a distance 8.8 times the diameter of the barrel from the feed throat. It is approximated that dynamic vulcanization (i.e., phase inversion) occurred at a location about 9 L/D. A ,5-dimethyl-2,5-di(t-butylperoxy)hexane peroxide was added to the extruder at a location 27 L/D. The amount of the peroxide added (in parts by weight per million parts by weight of thermoplastic vulcanizate), as well as the results of various physical tests that were performed on the resulting thermoplastic vulcanizate, are provided in Table II.

TABLE II

| | Samples | | | |
|---|---|---|---|---|
| | Sample 1-Control | Sample 2 | Sample 3 | Sample 4 |
| Post Cure Peroxide Level (ppm) | 0 | 163 | 325 | 636 |
| Physical Properties | | | | |
| Hardness (Shore A) | 59.6 | 58.7 | 57.7 | 58.9 |
| Weight Gain (%) | 95.5 | 97.0 | 99.5 | 92.5 |
| M100(mPa) | 1.88 | 1.83 | 1.75 | 1.79 |
| Tensile Strength (mPa) | 5.54 | 6.16 | 5.23 | 5.28 |
| Elongation (%) | 413 | 475 | 422 | 437 |
| Tensile Set (%) | 8.0 | 8.5 | 8.0 | 8.5 |
| ESR (micro inch) | 149 | 108 | 100 | 76 |

TABLE II-continued

| | Samples | | | |
|---|---|---|---|---|
| | Sample 1-Control | Sample 2 | Sample 3 | Sample 4 |
| Surface Spots (Avg. #) | 12.3 | 5.3 | 5.0 | 2.0 |
| LCR (Pa · sec.) | 83.0 | 78.2 | 76.9 | 74.6 |

Specific gravity was determined according to ASTM D-792. Shore hardness was determined according to ISO 868 with a five-second time interval. 10% modulus, ultimate tensile strength, elongation at break (ultimate elongation), and maximum strain were determined according to ISO 37 at 23° C. (unless otherwise specified) at 50 mm per minute by using an Instron testing machine. Weight gain was determined according to ASTM D-471 at 121° C. after 24 hours. LCR viscosity was determined according to ISO 11443 with a DYNISCO Capillary rheometer (Dynisco Instruments LLC) at 30:1 L/D (length/diameter) at 1200 s$^{-1}$ at 220° C.

Extrusion surface roughness (ESR) was measured as described in Ellul et al., "Chemical Surface Treatments of Natural Rubber And EPDM Thermoplastic Elastomers: Effects on Friction and Adhesion," *Rubber Chemistry and Technology*, Vol. 67, No. 4, pp. 582-601, (1994).

Various modifications and alterations that do not depart from the scope and spirit of this invention will become apparent to those skilled in the art. This invention is not to be duly limited to the illustrative embodiments set forth herein.

What is claimed is:

1. A process for preparing a modified thermoplastic vulcanizate compositions, the process comprising the steps of:
   i. providing a molten thermoplastic vulcanizate, where the thermoplastic vulcanizate includes cured ethylene-propylene-diene rubber dispersed within a matrix of propylene polymer, where the propylene polymer comprises at least 97 wt % of propylene-derived units, based on the weight of the propylene polymer, and where the thermoplastic vulcanizate is prepared by dynamically vulcanizing the ethylene-propylene-diene rubber with a non-peroxide curative to provide a degree of cure where less than 5 wt % of the rubber is extractable by cyclohexane at 23° C., and where the thermoplastic vulcanizate comprises from 75 to 90 wt % of the ethylene-propylene-diene rubber and from 10 to 30 wt % of the propylene polymer based on the entire weight of the ethylene-propylene-diene rubber and the propylene polymer combined;
   ii. introducing 100 to 700 parts by weight of peroxide per million parts by weight of the thermoplastic vulcanizate to the molten thermoplastic vulcanizate to produce the modified thermoplastic vulcanizate composition,
   where the modified thermoplastic vulcanizate is further formed into an extrudate characterized by an extrusion surface roughness (ESR) of 76 to 108 microinches and where the ESR of the extrudate of the modified thermoplastic vulcanizate is at least 27.5% less than an ESR of an extrudate formed from the same thermoplastic vulcanizate not modified with the peroxide.

2. The process of claim 1, where the rubber has a degree of cure where less than 3 wt % rubber is extractable by cyclohexane at 23° C.

3. The process of claim 1, where the amount of the peroxide introduced with the molten thermoplastic vulcanizate is at least 200 ppm and less than 700 parts by weight of the peroxide per million parts by weight of the thermoplastic vulcanizate.

4. The process of claim 1, where the modified extrudate of the modified thermoplastic vulcanizate is characterized by the ESR of from 76 to 100 microinches.

5. A continuous process for preparing thermoplastic vulcanizates, the process comprising the steps of:
   i. dynamically vulcanizing a rubber that is undergoing mixing with a polypropylene by using a non-peroxide curative within a first stage of the process to form a cured thermoplastic vulcanizate that is in a molten state, where the thermoplastic vulcanizate is cured such as to provide a degree of cure where the rubber has a crosslink density of at least 10×10$^{-5}$ moles per milliliter of rubber, and where the thermoplastic vulcanizate comprises from 75 to 90 wt % of the rubber and from 10 to 30 wt % of the polypropylene, based on the entire weight of the rubber and the polypropylene combined;
   ii. maintaining the cued thermoplastic vulcanizate in a molten state until a second stage; and
   iii. introducing 100 to 700 parts by weight of peroxide per million parts by weight of the thermoplastic vulcanizate to the molten cured thermoplastic vulcanizate in the second stage of the process to form a modified thermoplastic vulcanizate,
   where the modified thermoplastic vulcanizate is further fabricated into an extrudate characterized by an extrusion surface roughness (ESR) of 76 to 108 microinches and where the ESR of the extrudate of the modified thermoplastic vulcanizate is at least 27.5% less than an ESR of an extrudate formed from the same thermoplastic vulcanizate not modified with the peroxide.

6. The process of claim 5, where the non-peroxide curative in the first stage comprises a phenolic resin curative.

7. The process of claim 5, where said first stage and said second stage of the process take place within a single reactive extruder.

8. The process of claim 5, where said first stage and said second stage of the process take place in separate extruders.

9. The process of claim 5, where said rubber is an olefinic elastomeric copolymer.

10. The process of claim 5, where the peroxide is selected from the group consisting of di-tert-butyl peroxide, dicumyl peroxide, t-butylcumyl peroxide, α,α-bis(tert-butylperoxy) diisopropyl benzene 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof.

11. The process of claim 5, where the peroxide is selected from the group consisting of diaryl peroxides, ketone peroxides, peroxydicarbonates, peroxyesters, dialkyl peroxides, hydroperoxides, peroxyketals and mixtures thereof.

12. The process of claim 5, where the amount of the peroxide introduced with the molten thermoplastic vulcanizate is at least 200 ppm and less than 700 ppm parts by weight of the peroxide per million parts by weight of the thermoplastic vulcanizate.

13. A process for producing modified thermoplastic vulcanizates, the process comprising the steps of:
   i. introducing rubber and a polypropylene into a reactive extruder;
   ii. introducing a non-peroxide curative into the reactive extruder at a location downstream of the location of said introducing the rubber and the polypropylene;
   iii. mixing the rubber, the polypropylene, and the curative;
   iv. allowing said curative to cure the rubber and thereby cause phase inversion of the rubber within the polypropylene to form a thermoplastic vulcanizate, where the rubber is cured to have a degree of cure, such that less than 5 wt % of the rubber is extractable by cyclohexane at 23° C., and where the thermoplastic vulcanizate comprises from 75 to 90 wt % of the rubber and from 10 to 30 wt % of the polypropylene, based on the entire weight of the rubber and the polypropylene combined; and v. introducing 100 to 700 parts by weight of peroxide per million parts by weight of the thermoplastic vulcanizate into the reactive extruder at a location downstream of the phase inversion of the rubber to produce the modified thermoplastic vulcanizate, where the modified thermoplastic vulcanizate is further prepared into an extrudate characterized by an extrusion surface roughness (ESR) of 76 to 108 microinches and where the ESR of the extrudate of the modified thermoplastic vulcanizate is at least 27.5% less than an ESR of an extrudate formed from the same thermoplastic vulcanizate not modified with the peroxide.

14. The process of claim 13, where the rubber has a degree of cure where less than 3 wt % rubber is extractable by cyclohexane at 23° C.

* * * * *